United States Patent
Lu et al.

(10) Patent No.: US 10,606,495 B2
(45) Date of Patent: Mar. 31, 2020

(54) CREATING A STRUCTURALLY AWARE BLOCK STORAGE SYSTEM

(71) Applicant: International Business Machines Corporation, Armonk, NY (US)

(72) Inventors: Zhong-Shi Lu, Shanghai (CN); Cheng-Yong Zhao, Shanghai (CN); Mengze Liao, Shanghai (CN); Li Lei, Shanghai (CN); Min Fang, Shanghai (CN)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 15/970,718

(22) Filed: May 3, 2018

(65) Prior Publication Data

US 2019/0339889 A1    Nov. 7, 2019

(51) Int. Cl.
  G06F 3/00       (2006.01)
  G06F 3/06       (2006.01)
  G06F 12/02      (2006.01)
  G06F 9/455      (2018.01)

(52) U.S. Cl.
  CPC .......... *G06F 3/0632* (2013.01); *G06F 3/065* (2013.01); *G06F 3/067* (2013.01); *G06F 3/0631* (2013.01); *G06F 3/0644* (2013.01); *G06F 3/0647* (2013.01); *G06F 9/45558* (2013.01); *G06F 12/0284* (2013.01); *G06F 2009/45583* (2013.01)

(58) Field of Classification Search
  None
  See application file for complete search history.

(56) References Cited

U.S. PATENT DOCUMENTS

| 8,244,850 | B1 | 8/2012 | Roussos et al. |
| 2014/0095823 | A1 | 4/2014 | Shaikh et al. |
| 2015/0381723 | A1 | 12/2015 | Sancheti et al. |

OTHER PUBLICATIONS

Mell et al., "The NIST Definition of Cloud Computing," NIST Special Publication 800-145, Sep. 2011, 7 pages.
Mell et al., "The NIST Definition of Cloud Computing," Information Page, Version 15, Oct. 7, 2009, 2 pages.
NIST, "NIST Cloud Computing Program," Information Technology Laboratory webpage, last updated Nov. 13, 2013, 3 pages.
VMware, "Virtual Volumes," 2018, 5 pages retrieved from http://www.vmware.com/products/vsphere/virtual-volumes.html.
Docker Docs, "Docker storage drivers," 2018, pp. 1-6 retrived from https://docs.docker.com/engine/userguide/storagedriver/selectadriver/#shared-storage-systems-and-the-storage-driver.

*Primary Examiner* — Midys Rojas
(74) *Attorney, Agent, or Firm* — Zilka-Kotab, P.C.

(57) ABSTRACT

A computer-implemented method according to one embodiment includes creating, at a block storage system separate from a host system, a structural representation of image layer data utilized at the host system, mapping the structural representation created at the block storage system to the image layer data utilized at the host system, and performing one or more operations on the image layer data, utilizing the structural representation created at the block storage system.

20 Claims, 12 Drawing Sheets

CREATING A STRUCTURALLY AWARE BLOCK STORAGE SYSTEM

BACKGROUND

The present invention relates to container storage implementation, and more specifically, this invention relates to increasing container storage data awareness by block storage.

Software package services such as containers are a popular way to deploy and run services and applications. A block storage system may be used to provide needed storage for hosts implementing software package service provider. However, currently, the block storage system may not be aware of the structural representation of image layer data that is utilized within the host system. This may make operations such as migration, recovery, and optimization difficult, as they may need to be implemented utilizing a logical volume manager (LVM) located on the host system. Additionally, the image layer data of a first host may not be shared with a different host in a data center.

SUMMARY

A computer-implemented method according to one embodiment includes creating, at a block storage system separate from a host system, a structural representation of image layer data utilized at the host system, mapping the structural representation created at the block storage system to the image layer data utilized at the host system, and performing one or more operations on the image layer data, utilizing the structural representation created at the block storage system.

According to another embodiment, a computer program product for creating a structurally aware block storage system comprises a computer readable storage medium having program instructions embodied therewith, where the computer readable storage medium is not a transitory signal per se, and where the program instructions are executable by a processor to cause the processor to perform a method comprising creating, at a block storage system separate from a host system, a structural representation of image layer data utilized at the host system, utilizing the processor, mapping the structural representation created at the block storage system to the image layer data utilized at the host system, utilizing the processor, and performing, utilizing the processor, one or more operations on the image layer data, utilizing the structural representation created at the block storage system.

A system according to another embodiment includes a processor, and logic integrated with the processor, executable by the processor, or integrated with and executable by the processor, where the logic is configured to create, at a block storage system separate from a host system, a structural representation of image layer data utilized at the host system, map the structural representation created at the block storage system to the image layer data utilized at the host system, and perform one or more operations on the image layer data, utilizing the structural representation created at the block storage system.

Other aspects and embodiments of the present invention will become apparent from the following detailed description, which, when taken in conjunction with the drawings, illustrate by way of example the principles of the invention.

DETAILED DESCRIPTION

Figure 1:
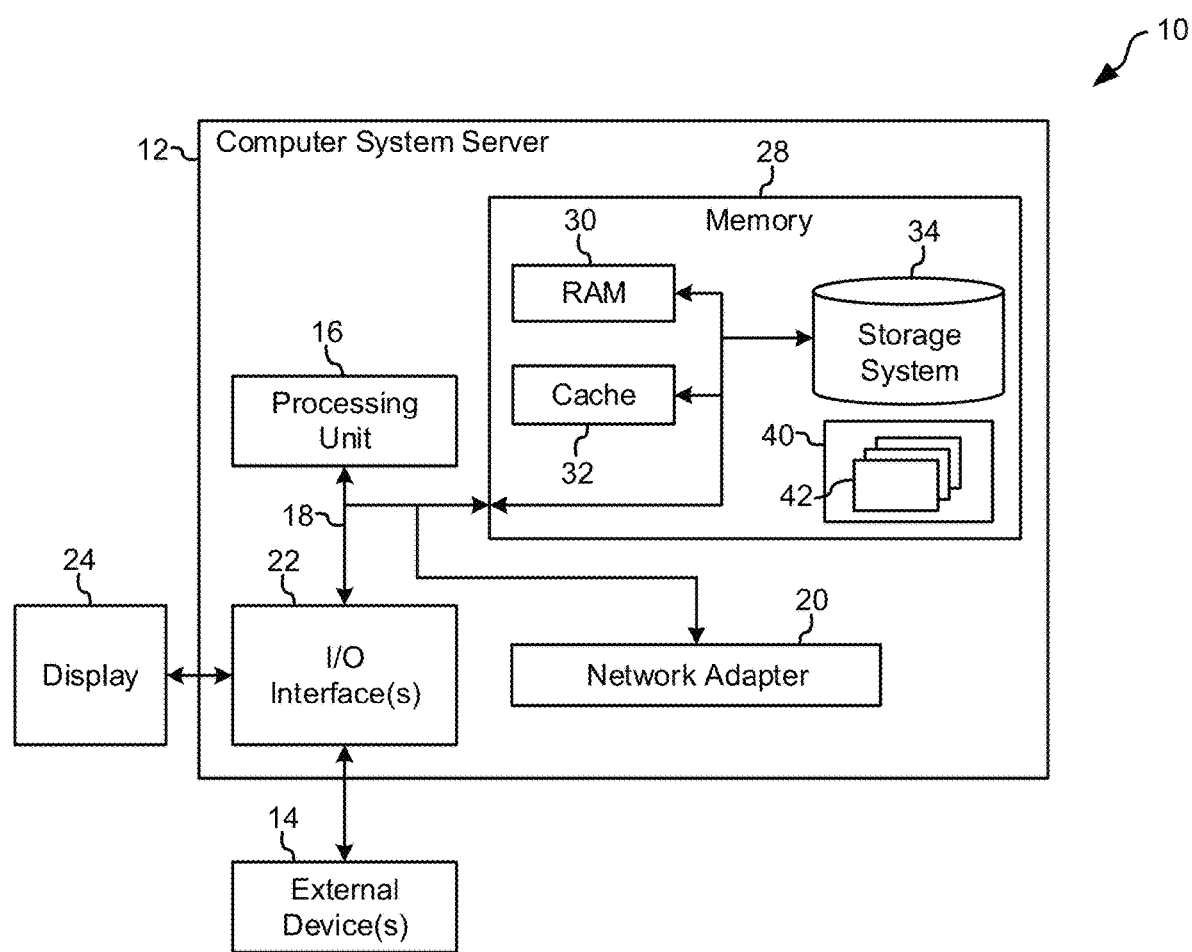
FIG. 1 depicts a cloud computing node according to an embodiment of the present invention.

The following description discloses several preferred embodiments of systems, methods and computer program products for creating a structurally aware block storage system. Various embodiments provide a method for creating and utilizing, at a block storage system, a structural representation of image layer data utilized at a host system.

The following description is made for the purpose of illustrating the general principles of the present invention and is not meant to limit the inventive concepts claimed herein. Further, particular features described herein can be used in combination with other described features in each of the various possible combinations and permutations.

Unless otherwise specifically defined herein, all terms are to be given their broadest possible interpretation including meanings implied from the specification as well as meanings understood by those skilled in the art and/or as defined in dictionaries, treatises, etc.

It must also be noted that, as used in the specification and the appended claims, the singular forms "a," "an" and "the" include plural referents unless otherwise specified. It will be further understood that the terms "includes" and/or "comprising," when used in this specification, specify the presence of stated features, integers, steps, operations, elements, and/or components, but do not preclude the presence or addition of one or more other features, integers, steps, operations, elements, components, and/or groups thereof.

The following description discloses several preferred embodiments of systems, methods and computer program products for creating a structurally aware block storage system.

In one general embodiment, a computer-implemented method includes creating, at a block storage system separate from a host system, a structural representation of image layer data utilized at the host system, mapping the structural representation created at the block storage system to the image layer data utilized at the host system, and performing one or more operations on the image layer data, utilizing the structural representation created at the block storage system.

In another general embodiment, a computer program product for creating a structurally aware block storage system comprises a computer readable storage medium having program instructions embodied therewith, where the computer readable storage medium is not a transitory signal per se, and where the program instructions are executable by a processor to cause the processor to perform a method comprising creating, at a block storage system separate from a host system, a structural representation of image layer data utilized at the host system, utilizing the processor, mapping the structural representation created at the block storage system to the image layer data utilized at the host system, utilizing the processor, and performing, utilizing the processor, one or more operations on the image layer data, utilizing the structural representation created at the block storage system.

In another general embodiment, a system includes a processor, and logic integrated with the processor, executable by the processor, or integrated with and executable by the processor, where the logic is configured to create, at a block storage system separate from a host system, a structural representation of image layer data utilized at the host system, map the structural representation created at the block storage system to the image layer data utilized at the host system, and perform one or more operations on the image layer data, utilizing the structural representation created at the block storage system.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Referring now to FIG. 1, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

Figure 2:
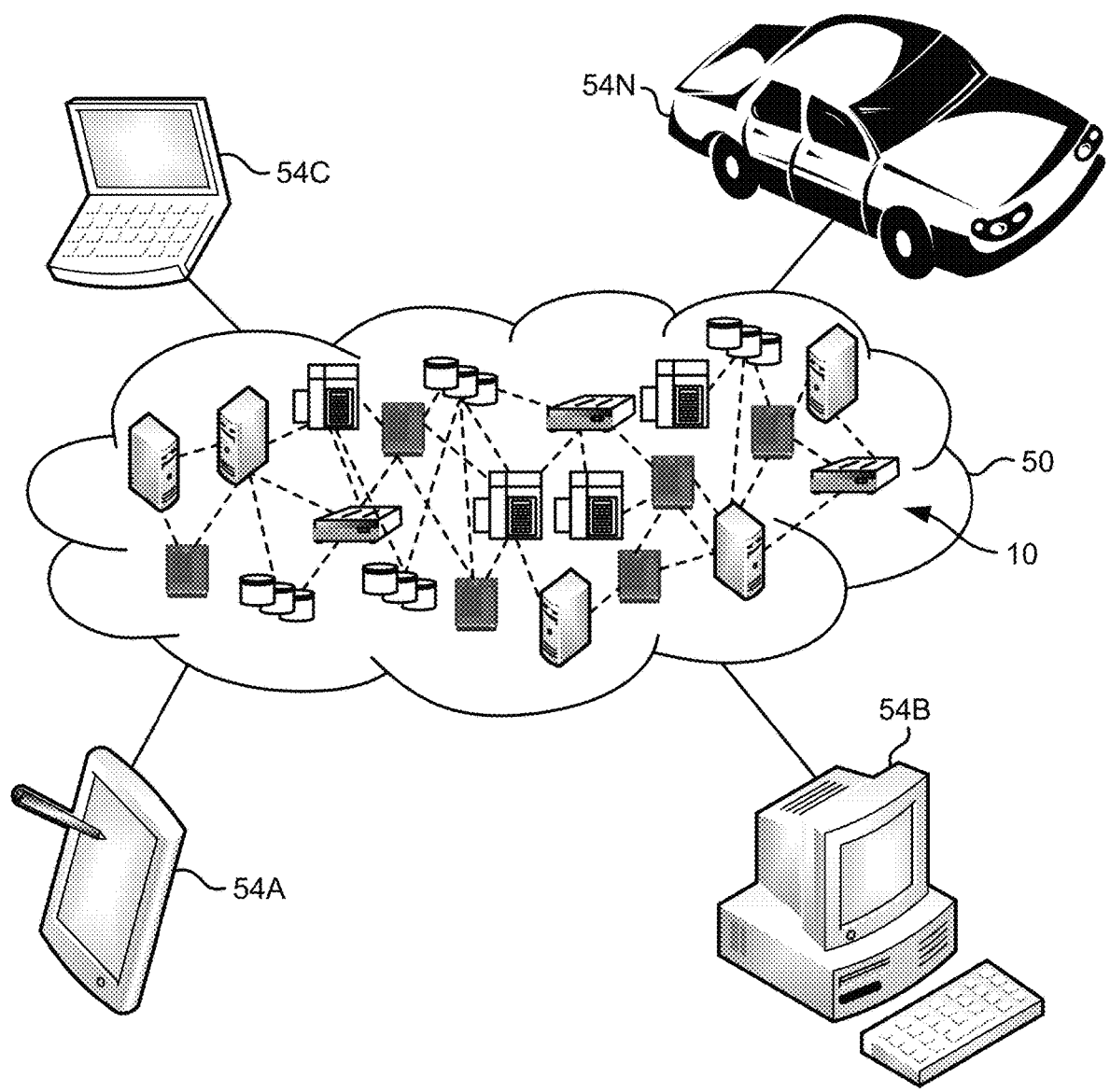
FIG. 2 depicts a cloud computing environment according to an embodiment of the present invention.

Referring now to FIG. 2, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 2 are intended to be illustrative only and that computing nodes 10 and cloud computing environment 50 can communicate with any type of computerized device over any type of network and/or network addressable connection (e.g., using a web browser).

Figure 3:
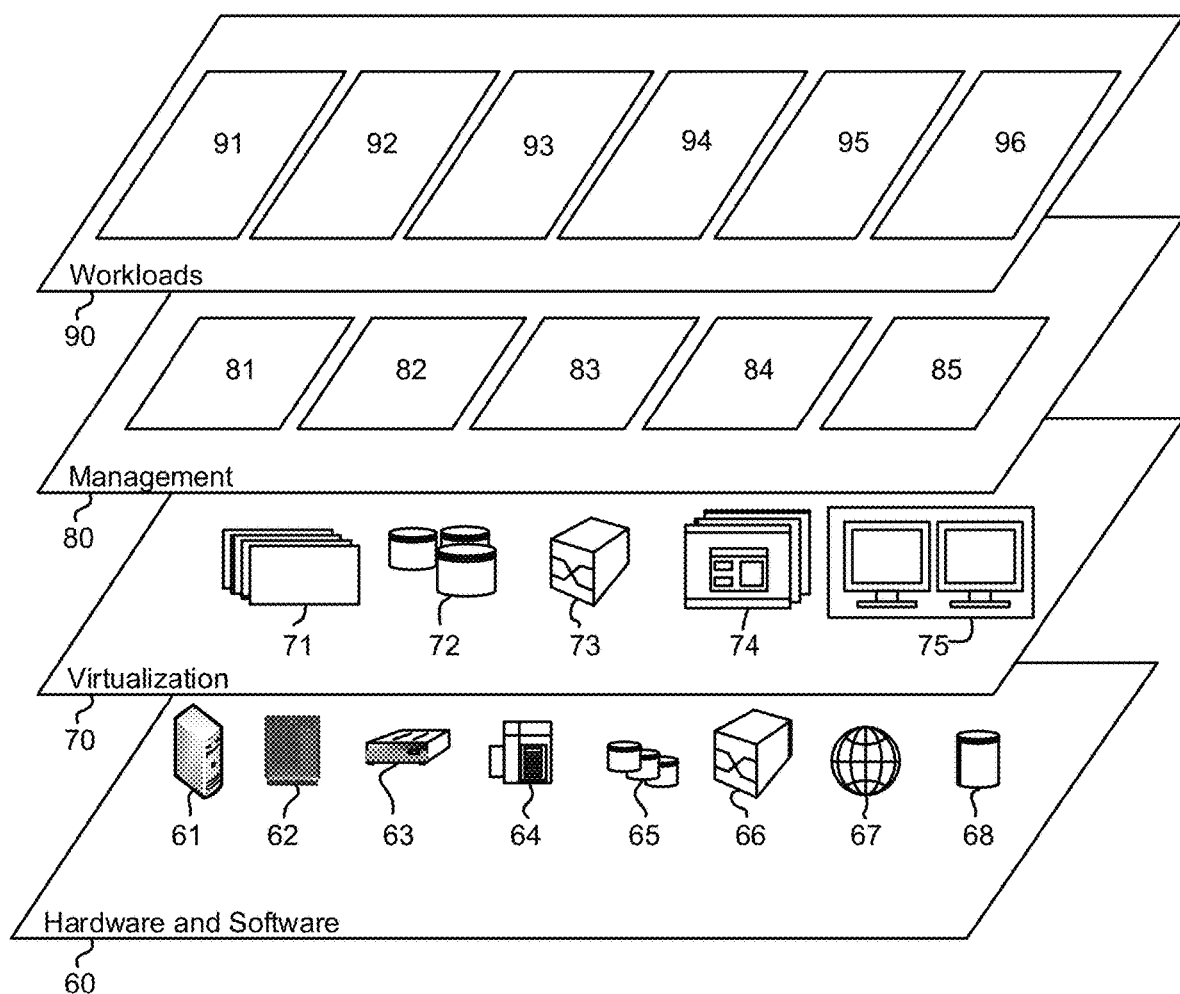
FIG. 3 depicts abstraction model layers according to an embodiment of the present invention.

Referring now to FIG. 3, a set of functional abstraction layers provided by cloud computing environment 50 (FIG. 2) is shown. It should be understood in advance that the components, layers, and functions shown in FIG. 3 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and data storage and management 96.

Figure 4:
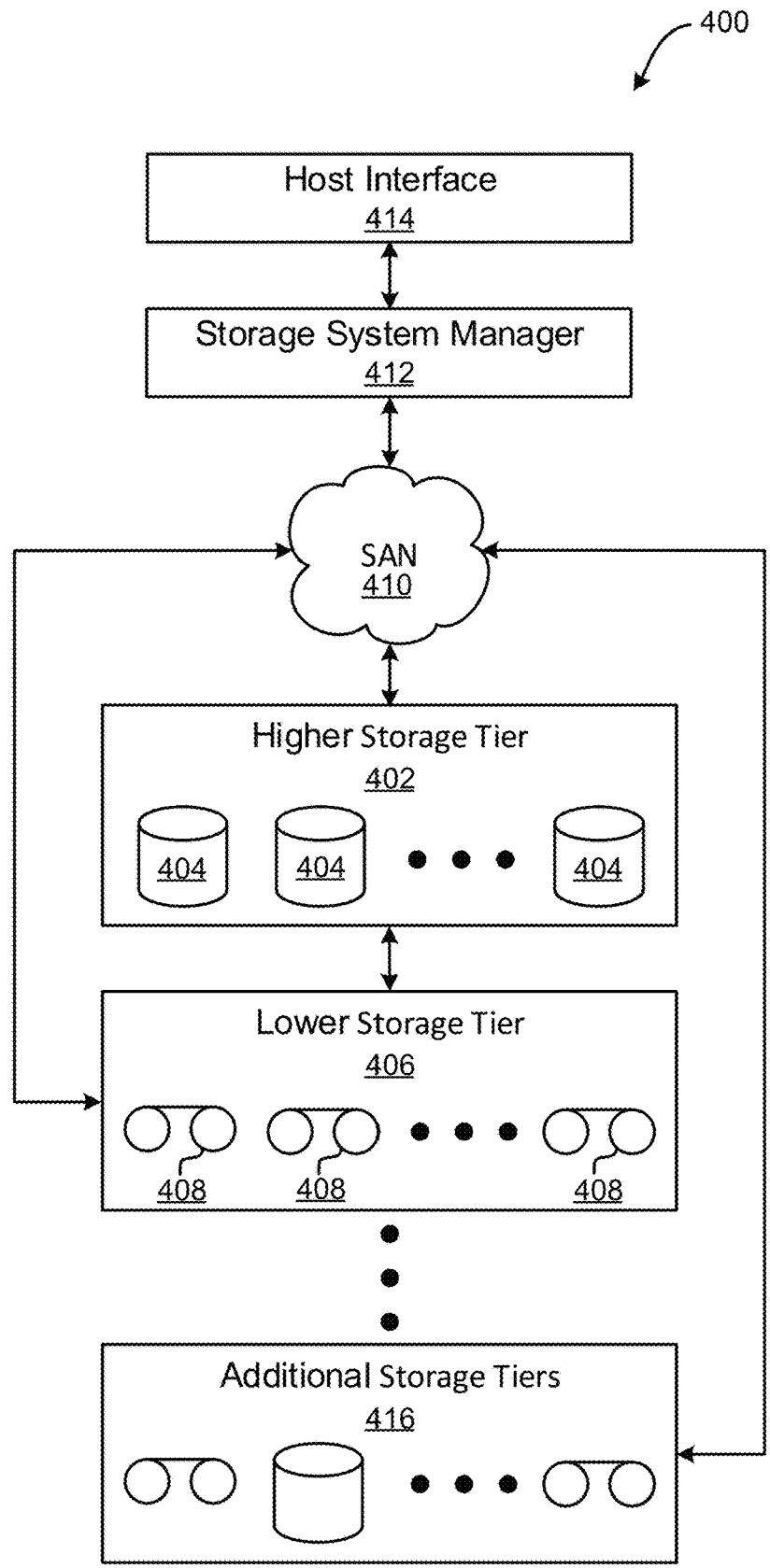
FIG. 4 illustrates a tiered data storage system in accordance with one embodiment.

Now referring to FIG. 4, a storage system 400 is shown according to one embodiment. Note that some of the elements shown in FIG. 4 may be implemented as hardware and/or software, according to various embodiments. The storage system 400 may include a storage system manager 412 for communicating with a plurality of media on at least one higher storage tier 402 and at least one lower storage tier 406. The higher storage tier(s) 402 preferably may include one or more random access and/or direct access media 404, such as hard disks in hard disk drives (HDDs), nonvolatile memory (NVM), solid state memory in solid state drives (SSDs), flash memory, SSD arrays, flash memory arrays, etc., and/or others noted herein or known in the art. The lower storage tier(s) 406 may preferably include one or more lower performing storage media 408, including sequential access media such as magnetic tape in tape drives and/or optical media, slower accessing HDDs, slower accessing SSDs, etc., and/or others noted herein or known in the art. One or more additional storage tiers 416 may include any combination of storage memory media as desired by a designer of the system 400. Also, any of the higher storage tiers 402 and/or the lower storage tiers 406 may include some combination of storage devices and/or storage media.

The storage system manager 412 may communicate with the storage media 404, 408 on the higher storage tier(s) 402 and lower storage tier(s) 406 through a network 410, such as a storage area network (SAN), as shown in FIG. 4, or some other suitable network type. The storage system manager 412 may also communicate with one or more host systems (not shown) through a host interface 414, which may or may not be a part of the storage system manager 412. The storage system manager 412 and/or any other component of the storage system 400 may be implemented in hardware and/or software, and may make use of a processor (not shown) for executing commands of a type known in the art, such as a central processing unit (CPU), a field programmable gate array (FPGA), an application specific integrated circuit (ASIC), etc. Of course, any arrangement of a storage system may be used, as will be apparent to those of skill in the art upon reading the present description.

In more embodiments, the storage system 400 may include any number of data storage tiers, and may include the same or different storage memory media within each storage tier. For example, each data storage tier may include the same type of storage memory media, such as HDDs, SSDs, sequential access media (tape in tape drives, optical disk in optical disk drives, etc.), direct access media (CD-ROM, DVD-ROM, etc.), or any combination of media storage types. In one such configuration, a higher storage tier 402, may include a majority of SSD storage media for storing data in a higher performing storage environment, and remaining storage tiers, including lower storage tier 406 and additional storage tiers 416 may include any combination of SSDs, HDDs, tape drives, etc., for storing data in a lower performing storage environment. In this way, more frequently accessed data, data having a higher priority, data needing to be accessed more quickly, etc., may be stored to the higher storage tier 402, while data not having one of these attributes may be stored to the additional storage tiers 416, including lower storage tier 406. Of course, one of skill in the art, upon reading the present descriptions, may devise many other combinations of storage media types to implement into different storage schemes, according to the embodiments presented herein.

According to some embodiments, the storage system (such as 400) may include logic configured to receive a request to open a data set, logic configured to determine if the requested data set is stored to a lower storage tier 406 of a tiered data storage system 400 in multiple associated portions, logic configured to move each associated portion of the requested data set to a higher storage tier 402 of the tiered data storage system 400, and logic configured to assemble the requested data set on the higher storage tier 402 of the tiered data storage system 400 from the associated portions.

Of course, this logic may be implemented as a method on any device and/or system or as a computer program product, according to various embodiments.

Figure 5:
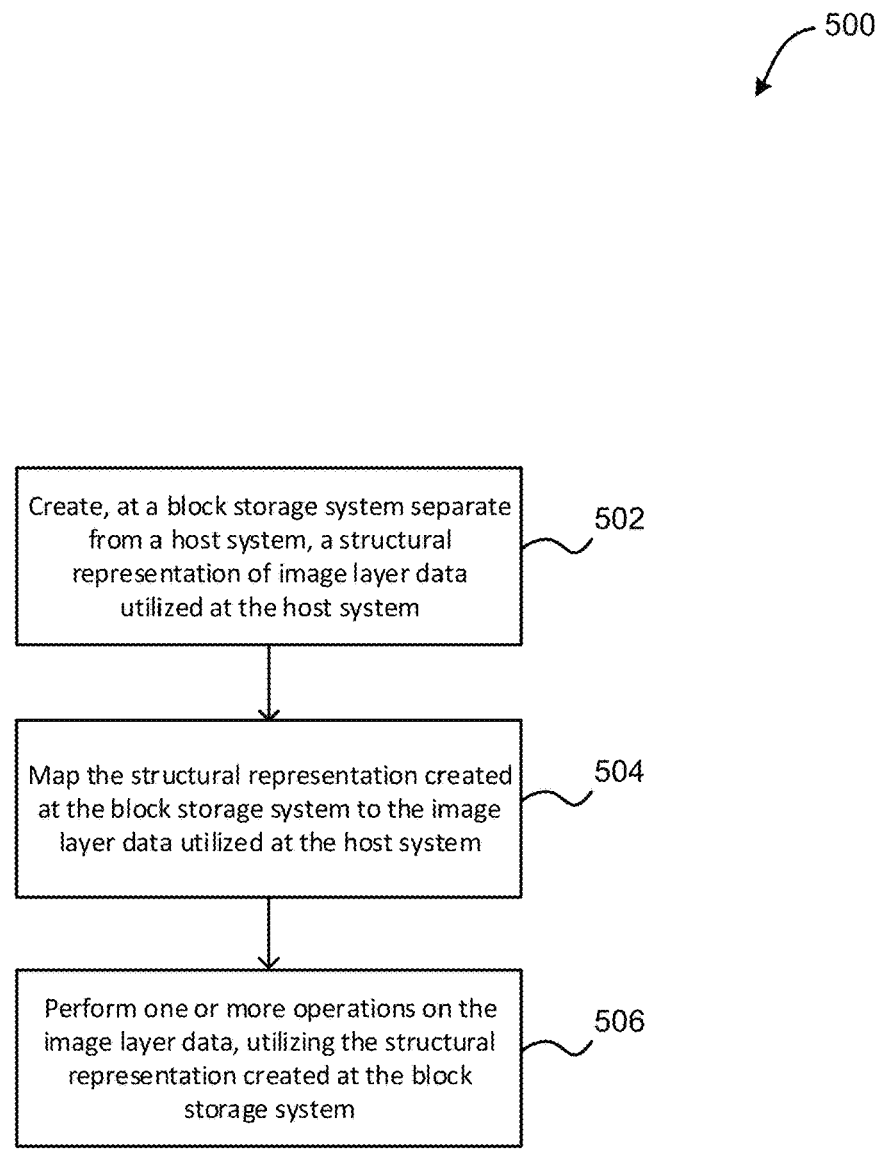
FIG. 5 illustrates a flowchart of a method for creating a structurally aware block storage system, in accordance with one embodiment.

Now referring to FIG. 5, a flowchart of a method 500 is shown according to one embodiment. The method 500 may be performed in accordance with the present invention in any of the environments depicted in FIGS. 1-4 and 6-7, among others, in various embodiments. Of course, more or less operations than those specifically described in FIG. 5 may be included in method 500, as would be understood by one of skill in the art upon reading the present descriptions.

Each of the steps of the method 500 may be performed by any suitable component of the operating environment. For example, in various embodiments, the method 500 may be partially or entirely performed by one or more servers, computers, or some other device having one or more processors therein. The processor, e.g., processing circuit(s), chip(s), and/or module(s) implemented in hardware and/or software, and preferably having at least one hardware component may be utilized in any device to perform one or more steps of the method 500. Illustrative processors include, but are not limited to, a central processing unit (CPU), an application specific integrated circuit (ASIC), a field programmable gate array (FPGA), etc., combinations thereof, or any other suitable computing device known in the art.

As shown in FIG. 5, method 500 may initiate with operation 502, where a structural representation of image layer data utilized at a host system is created at a block storage system separate from the host system. In one embodiment, the image layer data may include data associated with an image layer implemented by the host system. For example, the host system may run an enterprise operating system. In another example, the host system may implement the image layer and may store data associated with the image layer (e.g., utilizing a storage driver such as a device mapper storage driver, etc.).

Additionally, in one embodiment, the host system may include a software package service provider. For example, the host system may provide the software package service (e.g., container service, etc.) utilizing the image layer. In another example, the host system may provide a software service that relies on the image layer for implementation. In another embodiment, the image layer may provide the necessary runtime environment (e.g., libraries, settings, tools, etc.) to implement the software service. In yet another embodiment, the software service may be stored within the image layer as well (e.g., as executable code, etc.). In yet another embodiment, the host system may be implemented within a cloud computing environment.

Further, in one embodiment, the host system may be one of a plurality of hosts, where each host provides one or more software package services. In another embodiment, the image layer data utilized at the host system may include one or more one images. For example, the image may include an executable software package that includes a description of runtime environment details (e.g., libraries, settings, tools, etc.). In yet another embodiment, the image layer data utilized at the host system may include one or more one containers. For example, the container may include an instance of the image (e.g., an instance of the image that is run using the runtime environment details of the image, etc.).

Further still, in one embodiment, the image layer data utilized at the host system may include one or more container snapshots. For example, a container snapshot may include an image describing details of a container at a predetermined date and time. In another embodiment, the image layer data may be retrieved from a registry server associated with the host system. For example, the image layer data may describe one or more images, containers, and container snapshots utilized at the host system, as well as structural relationships (e.g., dependencies, etc.) between them. In yet another embodiment, the image layer data may include a plurality of container storage objects (e.g., base devices, images, containers, etc.) utilized at the host system, and the structural representation of the image layer data may describe a relationship between the plurality of container storage objects.

Also, in one embodiment, the host system may provide a software package service to a user as an instance of an image (e.g., as a running container, etc.). In another embodiment, the block storage system may store the image layer data utilized at the host system. For example, the host system may utilize one or more virtual disks for image layer storage. In another example, each virtual disk may have an associated logical unit number (LUN). In yet another example, one or more virtual disks may be provided by the block storage system for storing the image layer data. In yet another embodiment, the block storage system may be implemented within a cloud computing environment.

In addition, in one embodiment, creating the structural representation of the image layer data may include creating one or more storage system objects (e.g., volumes, snapshots, etc.) at the block storage system. For example, creating the structural representation of the image layer data may include creating, at the block storage system, a container pool. For instance, the container pool may include storage space within the block storage system that is specifically reserved for storing the structural representation of the image layer data. In another example, the container pool may be tagged as storing the structural representation of the image layer data. In yet another example, a pool may be created within a storage pool of the block storage system, and may be tagged as a container pool. In this way, the contents of the pool (e.g., volumes, snapshots, etc.) may not be operated on by others via GUI interfaces.

Furthermore, in one embodiment, creating the structural representation of the image layer data may include creating, at the block storage system, a storage volume within the container pool at the block storage system. For example, each storage volume may indicate a block of data within the block storage system. In another example, the block storage system may be implemented within a storage area network (SAN), and may store data in the storage volumes. In yet another example, the storage volume may be created by a storage agent located on the host system.

Further still, in one embodiment, the storage volume may be associated with a base device implemented at the host system. For example, the base device may include a low-level object implemented at the host system that is used to create an image within the image layer. In another embodiment, creating the structural representation of the image layer data may include creating, at the block storage system, a storage snapshot within the storage volume at the block storage system. For example, a storage snapshot may be created utilizing copy-on-write (COW) functionality within the block storage system. In another example, the storage snapshot may be created by a storage agent located on the host system.

Also, in one embodiment, the storage snapshot may be associated with an image implemented at the host system. In another embodiment, creating the structural representation of the image layer data may include creating, at the block storage system, a snapshot of a storage snapshot within the storage volume at the block storage system. For example, a snapshot of a storage snapshot may be created utilizing the copy-on-write (COW) functionality within the block storage system.

Additionally, in one embodiment, the snapshot of the storage snapshot may be associated with a container implemented at the host system. In another embodiment, the snapshot of the storage snapshot may be associated with a container snapshot implemented at the host system. In yet another embodiment, creating the structural representation of the image layer data may include creating, at the block storage system, metadata associated with the image layer data.

For example, the metadata may describe the image layer data stored within the host system. In another example, the metadata may be used to perform one or more actions associated with the image layer data (e.g., migration, recovery, etc.). In yet another example, the metadata may include a reference count, log information, tiering information, migration information, etc. In still another example, the metadata may record a structure of dependencies of one or more images, etc.

In another example, the metadata may be created and/or updated by a storage agent located on the host system. In yet another example, operation changes logged in metadata may be synchronized with a status of objects within the pool. In still another example, during an auto recovery or auto migration operation, the metadata may be accessed and used to automatically perform the required operations.

Further, method 500 may proceed with operation 504, where the structural representation created at the block storage system is mapped to the image layer data utilized at the host system. In one embodiment, a storage volume stored within the block storage system may be mapped to an associated base device implemented at the host system. In another embodiment, a storage snapshot stored within the block storage system may be mapped to an associated image or container implemented at the host system. For example, the storage snapshot may be stored within a storage volume, and the mapped image may be created utilizing an antecedent storage volume or snapshot.

In one embodiment, the image layer may have a tree structure. For example, a storage volume may be mapped to a base device. Additionally, a snapshot of the storage volume may be created, and a snapshot of that snapshot may be created, in order to create a new branch within the tree structure. In another embodiment, a plurality of storage volumes may be created, where each storage volume may be mapped to one of a plurality of base devices.

Further still, in one embodiment, a snapshot of the storage snapshot within the block storage system may be mapped to a container implemented at the host system. In another embodiment, a snapshot of the storage snapshot within the block storage system may be mapped to a container snapshot implemented at the host system.

Also, in one embodiment, the mapping may be implemented utilizing one or more pointers. For example, a storage volume stored within the block storage system may have a pointer to an associated base device implemented at the host system, a storage snapshot stored within the block storage system may have a pointer to an associated image implemented at the host system, a snapshot of the storage snapshot within the block storage system may have a pointer to a container snapshot implemented at the host system, etc.

In another embodiment, the image layer data may include one or more container storage objects utilized at the host system. In yet another embodiment, the structural representation may include storage system objects created within the storage system, based on the structural representation. In yet another embodiment, the mapping may include mapping each of the one or more container storage objects to a corresponding storage system object.

In addition, the mapping may be implemented utilizing one or more identifiers. For example, a storage volume stored within the block storage system include an identifier of an associated base device implemented at the host system, a storage snapshot stored within the block storage system may include an identifier of an associated image implemented at the host system, a snapshot of the storage snapshot within the block storage system may include an identifier of a container snapshot implemented at the host system, etc.

Furthermore, in one embodiment, the mapping may be performed by a storage agent located on the host system. In this way, structural dependencies of the image layer data utilized within the host system may be replicated utilizing the structural representation created at the block storage system. This may result in the implementation, within the block storage system, of the image layering mechanism used at the host system.

Further still, method 500 may proceed with operation 506, where one or more operations are performed on the image layer data, utilizing the structural representation created at the block storage system. In one embodiment, the one or more operations may include an optimization operation. In another embodiment, the one or more operations may include a migration operation.

For example, the image layer data may be migrated from the host system to another, different host system. In another example, a storage volume stored within the block storage system that is mapped to an associated base device implemented at the host system may be duplicated within the block storage system, and may be mapped to another different base device implemented at another different host system. In yet another example, a storage snapshot stored within the block storage system that is mapped to an associated image implemented at the host system may be duplicated within the block storage system, and may be mapped to another different image implemented at the other different host system.

Additionally, in one embodiment, the one or more operations may include a recovery operation. For example, the host system may fail, and the image layer data may be restored to the host system, utilizing the mapping between the structural representation created at the block storage system and the image layer data utilized at the host system.

Also, in one embodiment, the one or more operations may include mapping the structural representation created at the block storage system to other different image layer data utilized at the other different host system. In this way, data may be migrated from the host system to another system utilizing the block storage system directly, instead of having to perform migration using the host system (e.g., utilizing a logical volume manager of the host system, etc.). This may reduce an amount of processing and resources necessary to perform data migration, and may remove migration processing from the host system, which may improve a performance of the host system.

Figure 6:
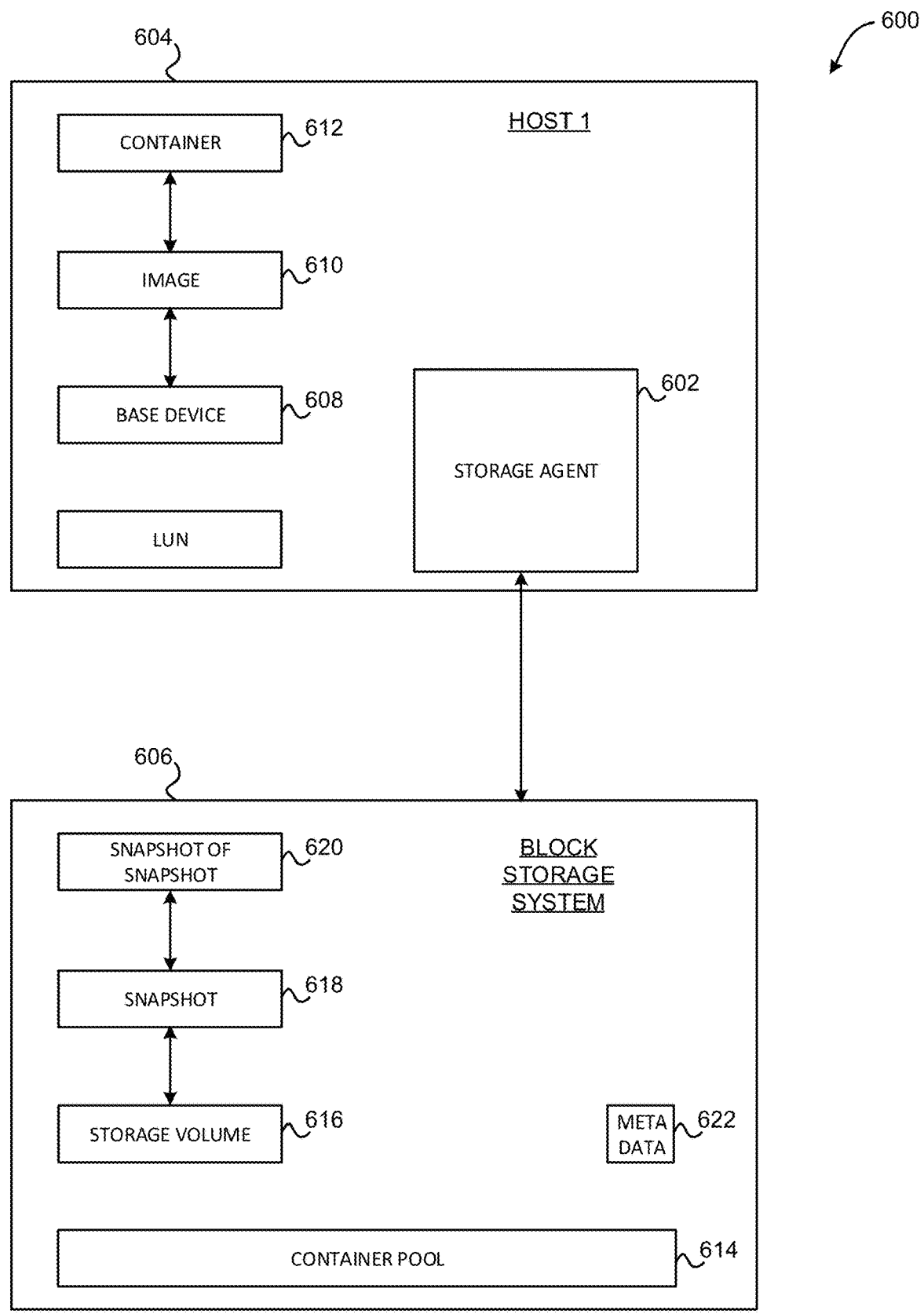
FIG. 6 illustrates an exemplary container-aware storage environment, in accordance with one embodiment.

FIG. 6 illustrates a container-aware storage environment 600, according to one exemplary embodiment. As shown, a storage agent 602 is included within a host system 604. In one embodiment, the storage agent 602 may be integrated with software package service provider software (e.g., container software, etc.) located on the host system 604. In another embodiment, the host system 604 may be one of a plurality of different hosts in communication with the block storage system 606. In yet another embodiment, the storage agent 602 may create components within the block storage system 606, based on image layer data currently utilized at the host system 604.

For example, the storage agent 602 may identify a base device 608 within the host system 604, where the base device 608 is used to create an image 610 as well as a container 612. In response to this identification, the storage agent 602 may create a container pool 614 in the block storage system 606. For example, the storage agent 602 may allocate a portion of a storage pool within the block storage system 606 and may tag the allocated portion with an identifier indicating that the portion is a container pool for storage of container data. The container pool 614 may be used to store and manage image layers for the host system 604 as well as additional hosts.

Additionally, the storage agent 602 may create a storage volume 616 within the container pool 614, and may map the storage volume 616 to the base device 608. Further, the storage agent 602 may create a first storage snapshot 618 of the storage volume 616 within the storage pool (e.g., using storage snapshot functionality of the block storage system 606, etc.), and may map the first storage snapshot 618 to the image 610. Further still, the storage agent 602 may create a snapshot 620 of the first storage snapshot 618 within the storage pool (e.g., using storage snapshot functionality of the block storage system 606, etc.), and may map the snapshot 620 to the container 612. In one embodiment, the storage volume 616 and the first storage snapshot 618 as well as the snapshot 620 may each have a reference count for image layer dependency management. In one embodiment, mapping may be performed utilizing one or more pointers, one or more identifiers, etc.

Also, the storage agent 602 may initialize the metadata 622 within the container pool 614, where the metadata 622 includes an information database associated with the container pool 614 and which is implemented in order to persist the information inside of the block storage system 606. For example, the metadata 622 may include image layer information, a reference count (to be used in a shared environment, etc.), log, optimization, tiering, and migration information, information used for implementing a quick recovery on another host, etc.

In this way, the storage agent 602 may directly map a relational structure of stored components within the block storage system 606 to a relational structure of components of the host system 604, and may implement a representation of layering of the container 612 and image 610 of the host system 604 utilizing storage snapshot functionality within the block storage system 606. In another embodiment, a driver for implementing the image layer data at the host system 604 may be specifically written for the block storage system 606.

Figure 7:
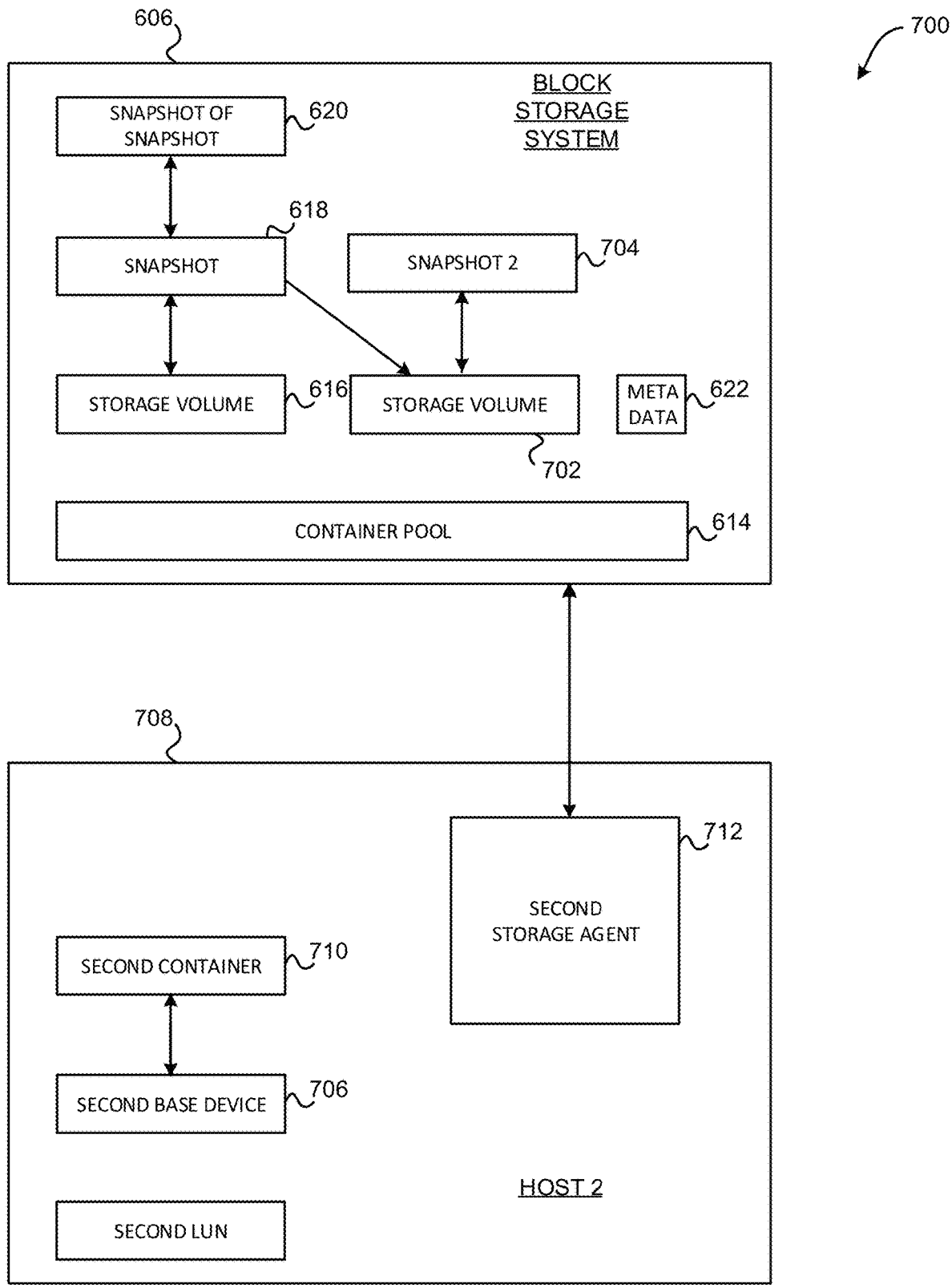
FIG. 7 illustrates an exemplary live migration environment utilizing a block storage system from FIG. 6, in accordance with one embodiment.

FIG. 7 illustrates a live migration environment 700 utilizing the block storage system 606 from FIG. 6, according to one exemplary embodiment. As shown, the first storage snapshot 618 stored within the block storage system 606 is cloned to create a second storage volume 702 within the block storage system 606. A second storage snapshot 704 is then made of the second storage volume 702. Since the second storage volume 702 is a clone of the first storage snapshot 618, the second storage snapshot 704 may be equivalent to the snapshot 620 from FIG. 6. In one embodiment, a difference (e.g., delta, etc.) between data stored in the first storage snapshot 618 and the snapshot 620 from FIG. 6 may be written into the second storage snapshot 704. In another embodiment, the second storage snapshot 704 may be equivalent to the snapshot 620 from FIG. 6.

Additionally, in one embodiment, the second storage volume 702 may be mapped to a second base device 706 of a second host 708, and the second storage snapshot 704 may be mapped to a second container 710 of the second host 708. Since the second storage snapshot 704 may be equivalent to the snapshot 620 from FIG. 6, the second container 710 of the second host 708 may be equivalent to the container 612 of the host system 604 in FIG. 6. In one embodiment, the mapping may be performed by the second storage agent 712 within the second host 708.

In this way, migration of the container 612 of the host system 604 in FIG. 6 to the second host 708 (e.g., by creating the second container 710 of the second host 708, etc.) may be performed without utilizing the host system 604 in FIG. 6. This may reduce an amount of processing and resource usage by the host system 604 during migration, which may in turn reduce a chance of a service interruption by the host system 604 during migration, may increase a performance of the host system 604 during migration, etc. In one embodiment, the migration may include a live migration. In another embodiment, a network status may be migrated utilizing a TCP connection repair kernel patch.

Additionally, in one embodiment, I/O performance may be more stable when compared with a logical volume manager (LVM) based implementation. In another embodiment, no CPU/IO overhead may be placed on the on a host system 604 when compared with a LVM based implementation. In yet another embodiment, migration and recovery solutions may be implemented independently from software (e.g., LVM, etc.) on a host system 604. In still another embodiment, ethernet and FC network operations may be offloaded to the block storage system 606.

Further, in one embodiment, large scale container support may be implemented with no performance degradation. In another embodiment, multi-tenancy and shared image/container storage may be used to save multiple copies of images. In yet another embodiment, a different file system may be contained on the host system 604.

Figure 8:
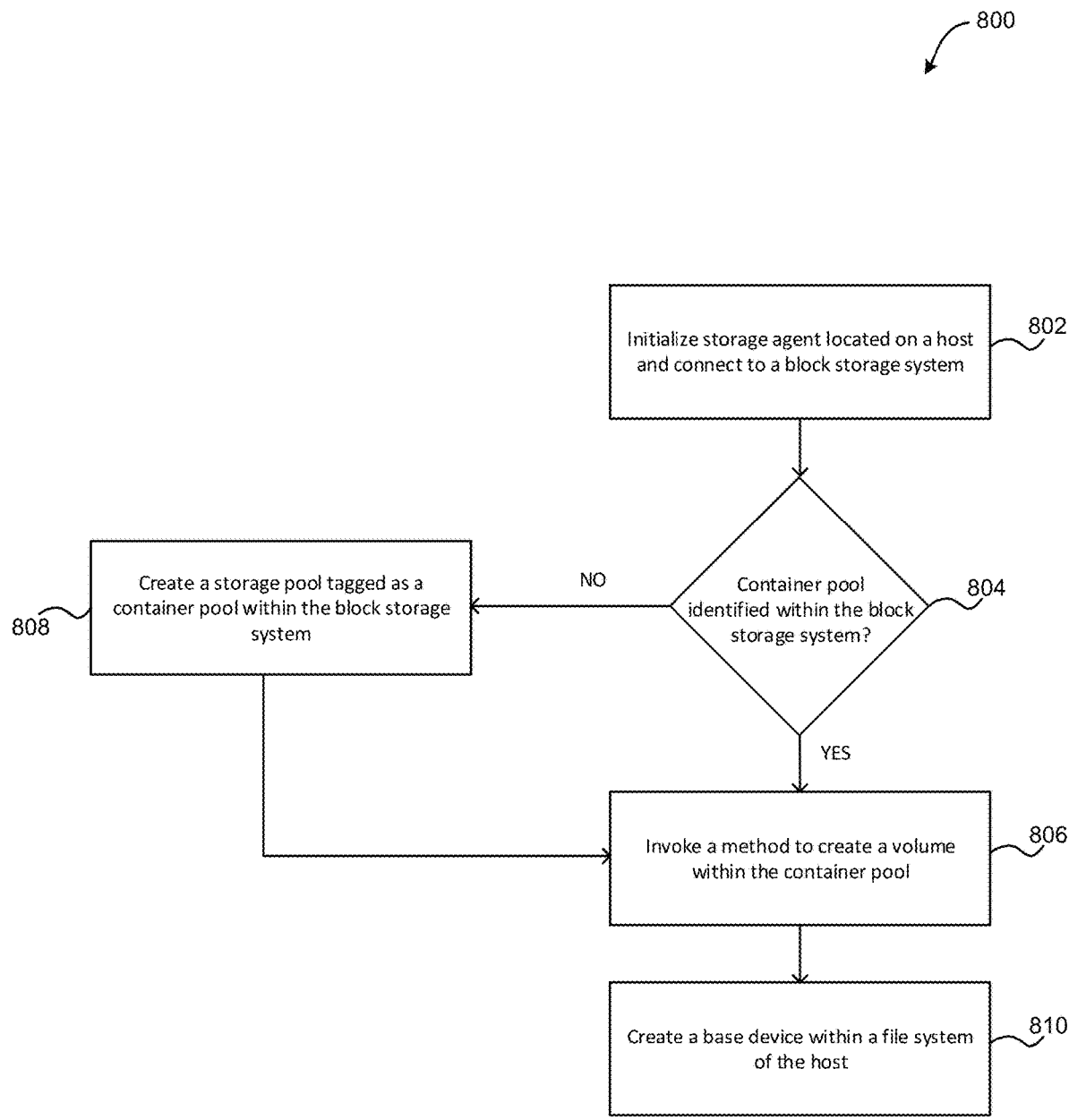
FIG. 8 illustrates a flowchart of a method for initializing a container pool, a storage volume, and a base device within a container-aware storage environment, in accordance with one embodiment.

Now referring to FIG. 8, a flowchart of a method 800 for initializing a container pool, a storage volume, and a base device within a container-aware storage environment is shown according to one embodiment. The method 800 may be performed in accordance with the present invention in any of the environments depicted in FIGS. 1-4 and 6-7, among others, in various embodiments. Of course, more or less operations than those specifically described in FIG. 8 may be included in method 800, as would be understood by one of skill in the art upon reading the present descriptions.

Each of the steps of the method 800 may be performed by any suitable component of the operating environment. For example, in various embodiments, the method 800 may be partially or entirely performed by one or more servers, computers, or some other device having one or more processors therein. The processor, e.g., processing circuit(s), chip(s), and/or module(s) implemented in hardware and/or software, and preferably having at least one hardware component may be utilized in any device to perform one or more steps of the method 800. Illustrative processors include, but are not limited to, a central processing unit (CPU), an application specific integrated circuit (ASIC), a field programmable gate array (FPGA), etc., combinations thereof, or any other suitable computing device known in the art.

As shown in FIG. 8, method 800 may initiate with operation 802, where a storage agent located on a host is initialized and connected to a block storage system. Additionally, method 800 may proceed with decision 804, where it is determined whether a storage pool tagged as a container pool is identified within the block storage system. For example, storage pools within the block storage system may be analyzed in order to determine whether the block storage system includes a storage pool with a tag indicating that the storage pool is a container pool.

Further, if it is determined in decision 804 that a storage pool tagged as a container pool is identified within the block storage system, then method 800 may proceed with operation 806, where a method is invoked to create a volume within the container pool. For example, a CreateVolume method may be invoked within the block storage system to create the volume within the storage pool tagged as the container pool.

Further still, if it is determined in decision 804 that a storage pool tagged as a container pool is not identified within the block storage system, then method 800 may proceed with decision 808, where a storage pool tagged as a container pool is created within the block storage system. The method may then proceed with operation 806.

Also, method 800 may proceed with decision 810, where a base device is created within a file system of the host system. In another embodiment, the base device created within the file system of the host system may be mapped to the volume created within the container pool. In this way, the volume in the block storage system may be representative of the base device at the host system.

Figure 9:
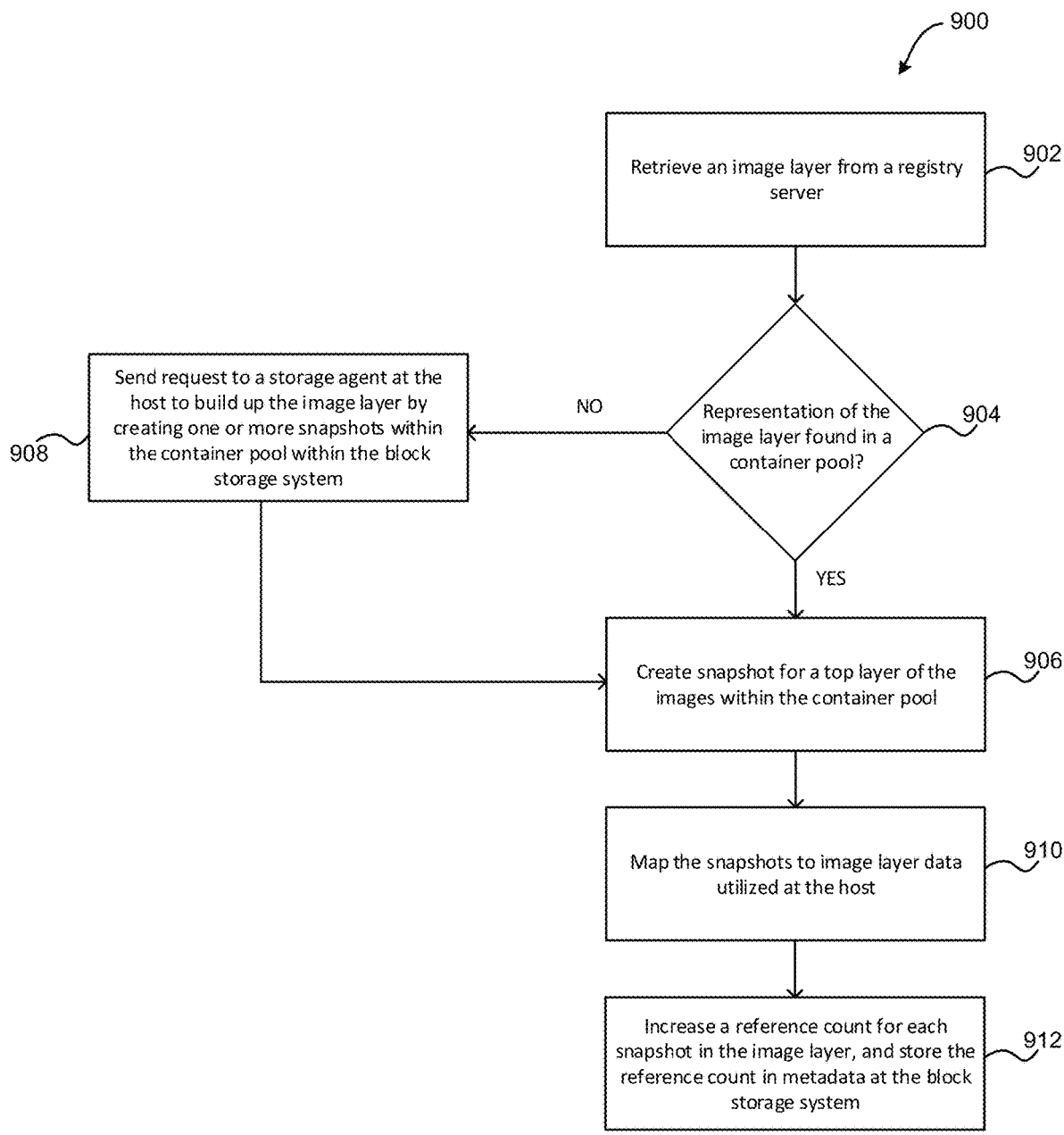
FIG. 9 illustrates a flowchart of a method for creating an image and container within a container-aware storage environment, in accordance with one embodiment.

Now referring to FIG. 9, a flowchart of a method 900 for creating an image and container within a container-aware storage environment is shown according to one embodiment. The method 900 may be performed in accordance with the present invention in any of the environments depicted in FIGS. 1-4 and 6-7, among others, in various embodiments. Of course, more or less operations than those specifically described in FIG. 9 may be included in method 900, as would be understood by one of skill in the art upon reading the present descriptions.

Each of the steps of the method 900 may be performed by any suitable component of the operating environment. For example, in various embodiments, the method 900 may be partially or entirely performed by one or more servers, computers, or some other device having one or more processors therein. The processor, e.g., processing circuit(s), chip(s), and/or module(s) implemented in hardware and/or software, and preferably having at least one hardware component may be utilized in any device to perform one or more steps of the method 900. Illustrative processors include, but are not limited to, a central processing unit (CPU), an application specific integrated circuit (ASIC), a field programmable gate array (FPGA), etc., combinations thereof, or any other suitable computing device known in the art.

As shown in FIG. 9, method 900 may initiate with operation 902, where an image layer is retrieved from a registry server. For example, the image layer may be retrieved from a remotely located registry server. Additionally, method 900 may proceed with decision 904, where it is determined whether a representation of the image layer is found in a container pool within the block storage system. For example, the image layer may describe one or more images and containers found within the host system, as well as a relationship between the images and containers.

Further, if it is determined in decision 904 that a representation of the image layer is found in a container pool within the block storage system, then method 900 may proceed with operation 906, where a snapshot is created for a top layer of the images within the container pool. Further still, if it is determined in decision 904 that a representation of the image layer is not found in a container pool within the block storage system, then method 900 may proceed with operation 908, where a request is sent to a storage agent at the host system to build up the image layer by creating one or more snapshots within the container pool within the block storage system. The method may then proceed with operation 906.

Also, method 900 may proceed with operation 910, where the snapshots are mapped to image layer data utilized at the host system. For example, the snapshots created at the block storage system may be mapped to their respective objects (e.g., containers, images, etc.) at the host system. In addition, method 900 may proceed with operation 912, where a reference count is increased for each snapshot in the image layer, and the reference count is stored in metadata at the block storage system. In this way, the reference count may keep track of layering information associated with images and containers utilized at the host system.

Figure 10:
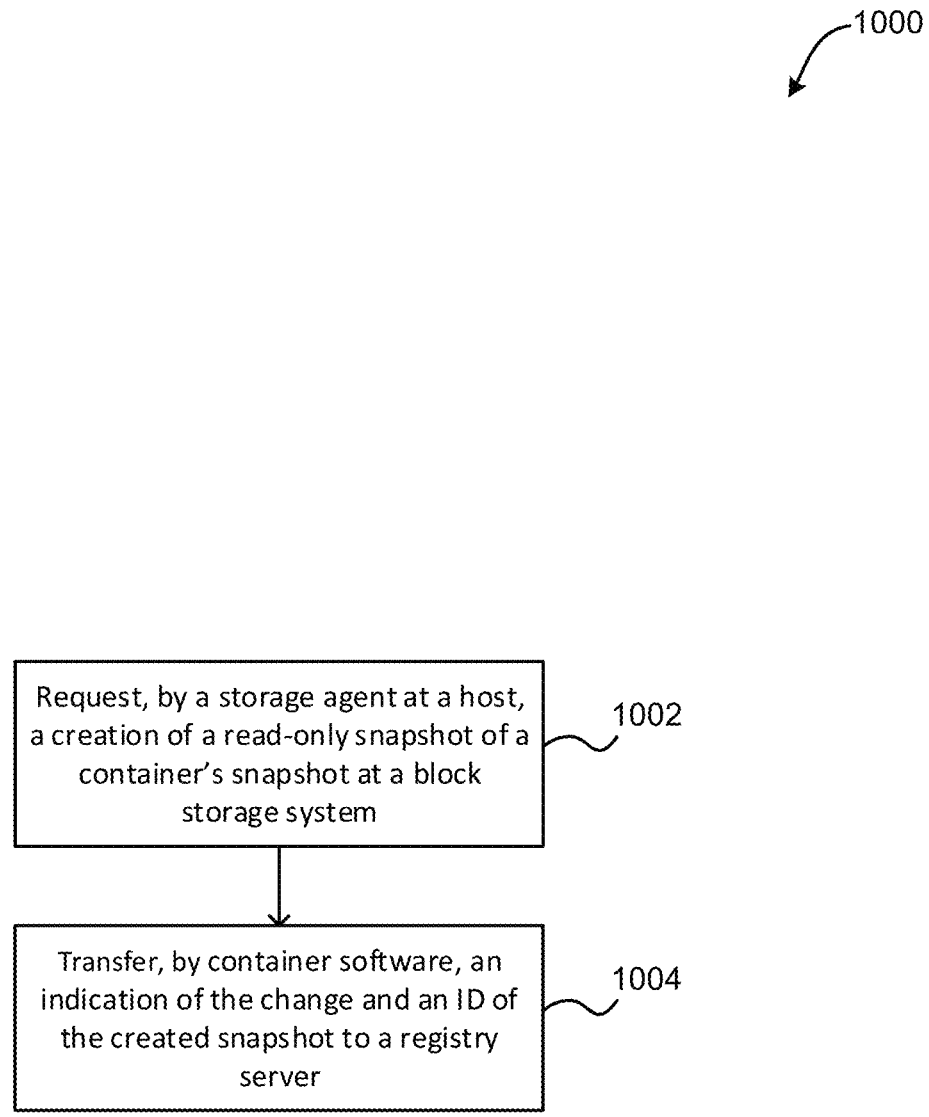
FIG. 10 illustrates a flowchart of a method for committing a container as a new image, in accordance with one embodiment.

Now referring to FIG. 10, a flowchart of a method 1000 for committing a container as a new image is shown according to one embodiment. The method 1000 may be performed in accordance with the present invention in any of the environments depicted in FIGS. 1-4 and 6-7, among others, in various embodiments. Of course, more or less operations than those specifically described in FIG. 10 may be included in method 1000, as would be understood by one of skill in the art upon reading the present descriptions.

Each of the steps of the method 1000 may be performed by any suitable component of the operating environment. For example, in various embodiments, the method 1000 may be partially or entirely performed by one or more servers, computers, or some other device having one or more processors therein. The processor, e.g., processing circuit(s), chip(s), and/or module(s) implemented in hardware and/or software, and preferably having at least one hardware component may be utilized in any device to perform one or more steps of the method 1000. Illustrative processors include, but are not limited to, a central processing unit (CPU), an application specific integrated circuit (ASIC), a field programmable gate array (FPGA), etc., combinations thereof, or any other suitable computing device known in the art.

As shown in FIG. 10, method 1000 may initiate with operation 1002, where a storage agent at a host requests a creation of a read-only snapshot of a container's snapshot at a block storage system. Additionally, method 1000 may proceed with operation 1004, where container software transfers an indication of the change and an ID of the created snapshot to a registry server.

Figure 11:
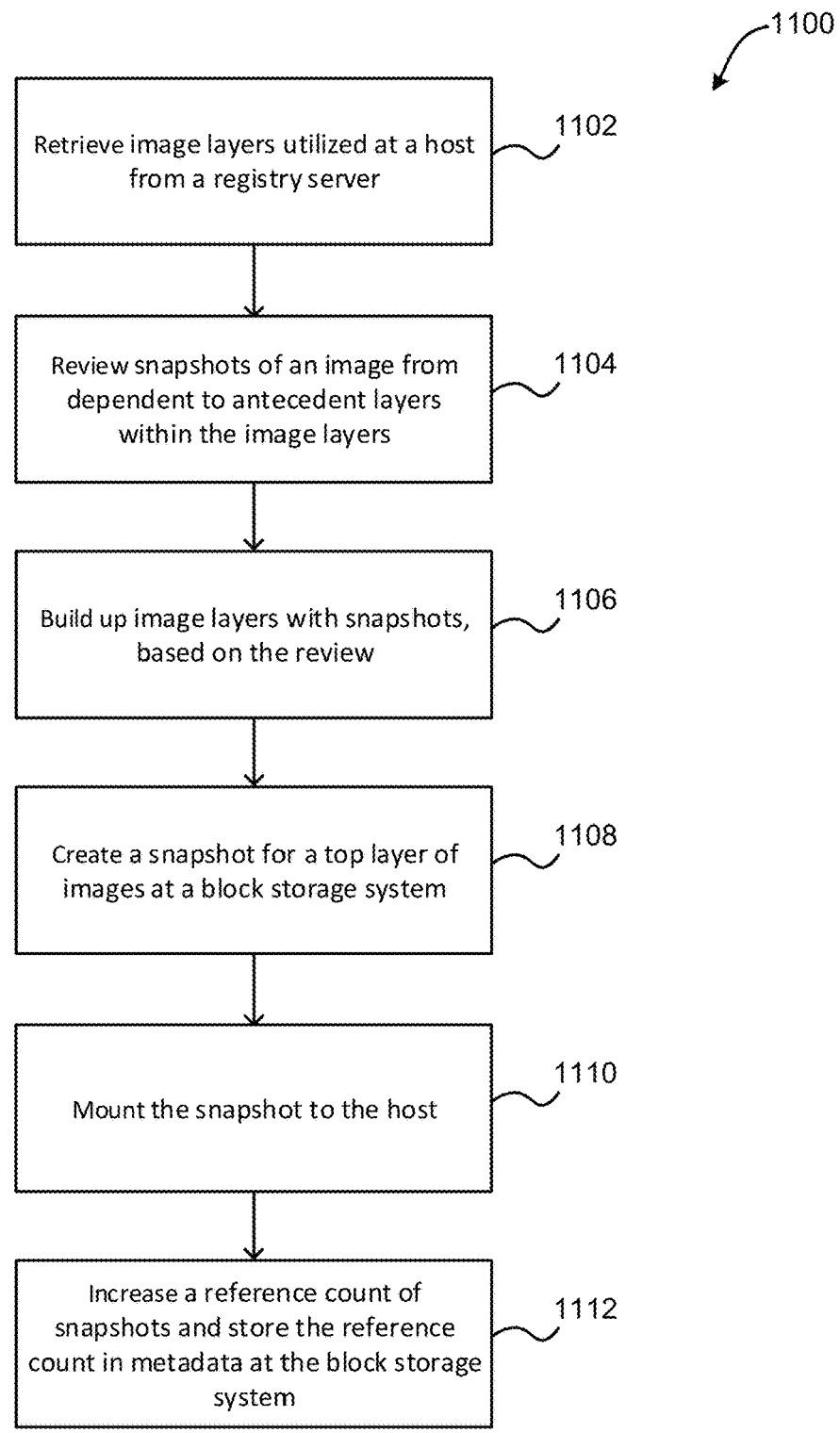
FIG. 11 illustrates a flowchart of a method for sharing and reusing an image layer among multiple hosts, in accordance with one embodiment.

Now referring to FIG. 11, a flowchart of a method 1100 for sharing and reusing an image layer among multiple hosts is shown according to one embodiment. The method 1100 may be performed in accordance with the present invention in any of the environments depicted in FIGS. 1-4 and 6-7, among others, in various embodiments. Of course, more or less operations than those specifically described in FIG. 11 may be included in method 1100, as would be understood by one of skill in the art upon reading the present descriptions.

Each of the steps of the method 1100 may be performed by any suitable component of the operating environment. For example, in various embodiments, the method 1100 may be partially or entirely performed by one or more servers, computers, or some other device having one or more processors therein. The processor, e.g., processing circuit(s), chip(s), and/or module(s) implemented in hardware and/or software, and preferably having at least one hardware component may be utilized in any device to perform one or more steps of the method 1100. Illustrative processors include, but are not limited to, a central processing unit (CPU), an application specific integrated circuit (ASIC), a field programmable gate array (FPGA), etc., combinations thereof, or any other suitable computing device known in the art.

As shown in FIG. 11, method 1100 may initiate with operation 1102, where image layers utilized at a host are retrieved from a registry server. Additionally, method 1100 may proceed with operation 1104, where snapshots of an image are reviewed from dependent to antecedent layers within the image layers. Further, method 1100 may proceed with operation 1106, where image layers are built up with snapshots, based on the review.

Further, method 1100 may proceed with operation 1108, where a snapshot is created for a top layer of images at a block storage system. Further still, method 1100 may proceed with operation 1110, where the snapshot is mounted to the host system. Also, method 1100 may proceed with operation 1112, where a reference count of snapshots is increased and stored in metadata at the block storage system.

Figure 12:
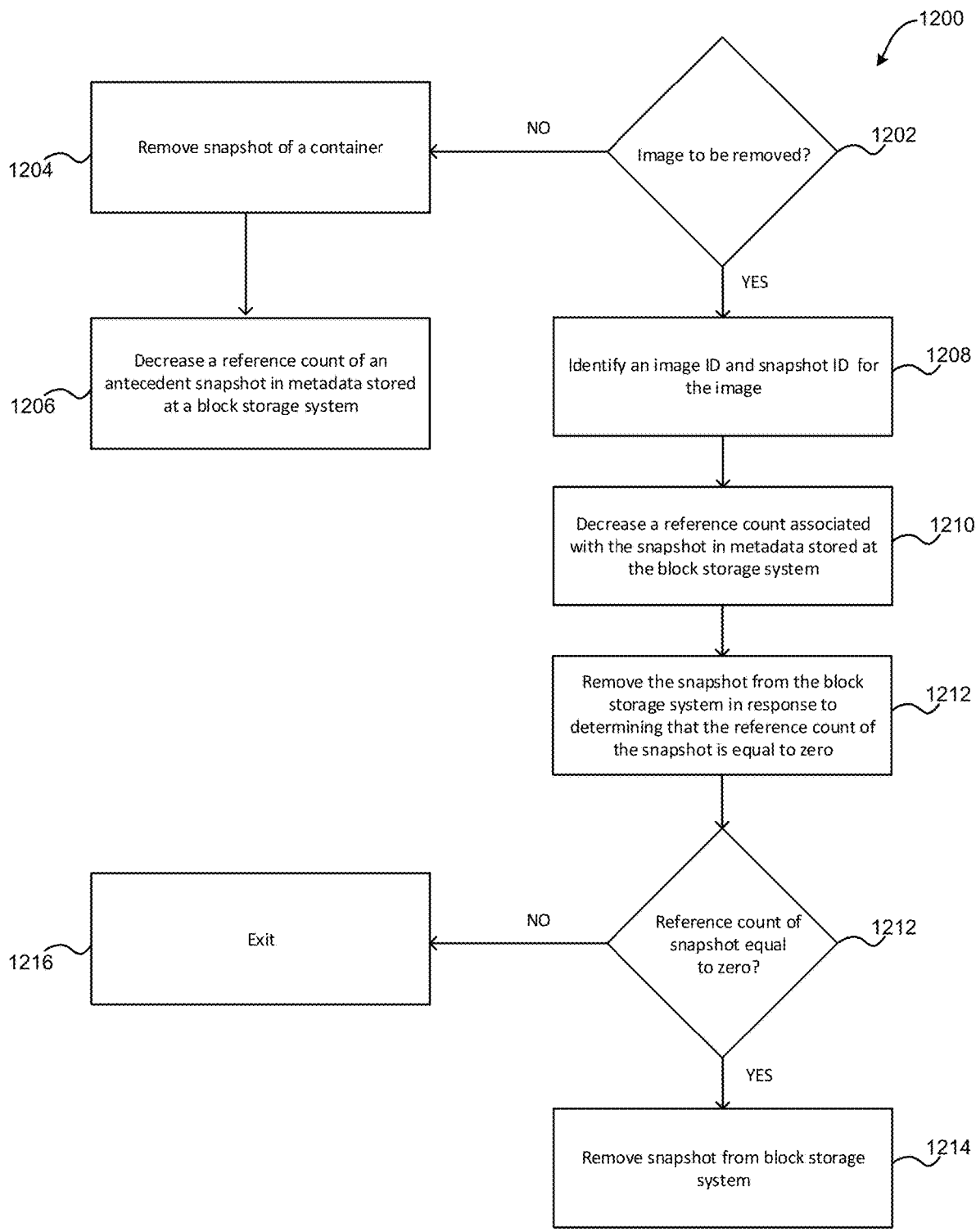
FIG. 12 illustrates a flowchart of a method for removing an image and container, in accordance with one embodiment.

Now referring to FIG. 12, a flowchart of a method 1200 for removing an image and container is shown according to one embodiment. The method 1200 may be performed in accordance with the present invention in any of the environments depicted in FIGS. 1-4 and 6-7, among others, in various embodiments. Of course, more or less operations than those specifically described in FIG. 12 may be included in method 1200, as would be understood by one of skill in the art upon reading the present descriptions.

Each of the steps of the method 1200 may be performed by any suitable component of the operating environment. For example, in various embodiments, the method 1200 may be partially or entirely performed by one or more servers, computers, or some other device having one or more processors therein. The processor, e.g., processing circuit(s), chip(s), and/or module(s) implemented in hardware and/or software, and preferably having at least one hardware component may be utilized in any device to perform one or more steps of the method 1200. Illustrative processors include, but are not limited to, a central processing unit (CPU), an application specific integrated circuit (ASIC), a field programmable gate array (FPGA), etc., combinations thereof, or any other suitable computing device known in the art.

As shown in FIG. 12, method 1200 may initiate with decision 1202, where it is determined whether an image is to be removed. If it is determined in decision 1202 that an image is not to be removed, then method 1200 may proceed with operation 1204, where a snapshot of a container is removed. Additionally, method 1200 may proceed with operation 1206, where a reference count of an antecedent snapshot is decreased in metadata stored at a block storage system.

Further, if it is determined in decision 1202 that an image is to be removed, then method 1200 may proceed with operation 1208, where an image ID and snapshot ID are identified for the image. In one embodiment, the image ID may identify the image utilized at a host, and the snapshot ID may identify the representation of the image within the block storage system. Further still, method 1200 may proceed with operation 1210, where a reference count associated with the snapshot is decreased in metadata stored at the block storage system.

Also, method 1200 may proceed with decision 1212, where it is determined whether the reference count associated with the snapshot is equal to zero. If it is determined in decision 1212 that the reference count is equal to zero, then in operation 1214 the snapshot is removed from the block storage system. If it is determined in decision 1212 that the reference count is not equal to zero, then in operation 1216 the method 1200 exits.

Container-Aware Block Storage

In one embodiment an image/container awareness capability may be supported by storing an image/container layer in a block storage system, instead of attaching LUNs as ordinary physical devices and managing the image/container layer functionality through an LVM on a host. More specifically, a mapping may be created between storage system objects (volume, snapshot, snapshot of snapshot) and an image/container's storage objects (base device, image, container).

In another embodiment, an image/container storage layer may be implemented by leveraging the storage system of a COW (copy-on-write) snapshot, and snapshot of snapshot functionality, inside of the block storage system. The volume at a block storage system maps to a "base device" on a host, and the snapshot of snapshot within the block storage system may create a relationship between two images, so that all snapshots may form a tree structure, where each leaf of the tree may be the active container which is now running on a host. This may present a solution to managing an image/container layer that is retrieved from a registry server, where all the image/container layer information and relationships are stored inside of a block storage system, and can therefore be shared and reused for all hosts in a data center.

An implementation of image/container layer storage within a block storage system may include three components—a container manager, metadata, and a storage agent. These three components may work together to store and manage the image/container information in a block storage system and may make the block storage system aware of the container, in order to make the image layer data transparent and compatible with a host platform above a storage driver level.

In one embodiment, a container manager may include a software component which may work in a block storage system to search an available reuse layer, to maintain an image/container layer tree, to manage a storage pool/volume/snapshot, to compute a mapping of a snapshot ID and an image/container ID, and to make an authentication and authorization of a software package service provider container in shared environment.

In another embodiment, the metadata be stored in a storage location within a storage pool with a tag "container," and may be used to store and persist image layer information such as a reference count of each node of layer, as well as logging, optimization, tiering, migration, and recovery information inside of the block storage system.

In yet another embodiment, the storage agent may include a software component that is integrated with a software package service provider storage driver installed on each host for translating software package service provider operations to a set of appropriate commands sent to the block storage system.

Also, in one embodiment, when a "pull" command is issued by a user, a storage agent may ask a container manager to retrieve image layer information from a registry server, and may traverse snapshots of the image from a dependent to an antecedent layer in a retrieved image/container layer tree. The storage agent may then ask the container manager to build up the image layers on the recent snapshot with same common layer found in the image/container layer tree, may increase a reference count of each reused snapshots into metadata, and may then attach and mount the snapshot to the host system.

When a "commit" command is issued by user, the storage agent may ask the storage system to create a read-only snapshot of the container's snapshot, and may log the action via the container manager.

When a "remove image" command is issued by user, the storage agent may ask the container manager to check the ownership of an image associated with the host system which sent the request, decrease reference count of snapshot, if the reference count of snapshot is zero, and remove the snapshot.

In this way, the image/container layer in the data center may be shared with the block storage system, such that the block storage system may be aware of the container and all of the necessary information of the image/container stored in order to recover them independently in the block storage system. The cost of CPU cycles, I/Os and storage from the LVM and the device mapper mechanism on each host may be reduced, and the block storage system may be able to implement storage of the centralized image/container layer, optimization of associated performance, independent recovery of the image/container, etc.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein includes an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which includes one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Moreover, a system according to various embodiments may include a processor and logic integrated with and/or executable by the processor, the logic being configured to perform one or more of the process steps recited herein. By integrated with, what is meant is that the processor has logic embedded therewith as hardware logic, such as an application specific integrated circuit (ASIC), a FPGA, etc. By executable by the processor, what is meant is that the logic is hardware logic; software logic such as firmware, part of an operating system, part of an application program; etc., or some combination of hardware and software logic that is accessible by the processor and configured to cause the processor to perform some functionality upon execution by the processor. Software logic may be stored on local and/or remote memory of any memory type, as known in the art. Any processor known in the art may be used, such as a software processor module and/or a hardware processor such as an ASIC, a FPGA, a central processing unit (CPU), an integrated circuit (IC), a graphics processing unit (GPU), etc.

It will be clear that the various features of the foregoing systems and/or methodologies may be combined in any way, creating a plurality of combinations from the descriptions presented above.

It will be further appreciated that embodiments of the present invention may be provided in the form of a service deployed on behalf of a customer to offer service on demand.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A computer-implemented method, comprising:
   creating, at a block storage system separate from a host system, a structural representation of image layer data utilized at the host system, including:
      creating, at the block storage system, a container pool that includes storage space within the block storage system that is specifically reserved for storing the structural representation of the image layer data,
      creating, at the block storage system, a storage volume within the container pool at the block storage system that indicates a block of data within the block storage system, and
      creating, at the block storage system, a storage snapshot within the storage volume, where the storage snapshot is associated with an image implemented at the host system;
   mapping the structural representation created at the block storage system to the image layer data utilized at the host system; and
   performing one or more operations on the image layer data, utilizing the structural representation created at the block storage system.

2. The computer-implemented method of claim 1, wherein the image layer data utilized at the host system includes the image, the image including an executable software package that includes a description of runtime environment details.

3. The computer-implemented method of claim 1, wherein the image layer data utilized at the host system includes a container, the container including an instance of the image that is run using runtime environment details of the image.

4. The computer-implemented method of claim 1, wherein the image layer data utilized at the host system includes one or more container snapshots, where each container snapshot describes details of a container at a predetermined date and time.

5. The computer-implemented method of claim 1, wherein the image layer data is retrieved from a registry server associated with the host system.

6. The computer-implemented method of claim 1, wherein creating the structural representation of the image layer data further includes:
   creating, at the block storage system, a snapshot of the storage snapshot, and
   creating, at the block storage system, metadata that describes the image layer data.

7. The computer-implemented method of claim 1, wherein mapping the structural representation created at the block storage system to the image layer data utilized at the host system includes:
   implementing a pointer from the storage volume to an associated base device implemented at the host system, and
   implementing a pointer from the storage snapshot to an associated image implemented at the host system.

8. The computer-implemented method of claim 1, wherein performing the one or more operations are performed on the image layer data, utilizing the structural representation created at the block storage system, includes:
   duplicating the storage volume within the block storage system, and mapping the duplicate storage volume to another different base device implemented at another different host system, and
   duplicating the storage snapshot within the block storage system, and mapping the duplicate storage snapshot to another different image implemented at the other different host system.

9. The computer-implemented method of claim 1, wherein the image layer data includes the image, the image including an executable software package that includes a description of runtime environment details, and creating the structural representation of the image layer data further includes:
   creating, at the block storage system, a snapshot of the storage snapshot, and
   creating, at the block storage system, metadata that describes the image layer data;
   wherein mapping the structural representation created at the block storage system to the image layer data utilized at the host system includes:
      implementing a pointer from the storage volume to an associated base device implemented at the host system,
      implementing a pointer from the storage snapshot to an associated image implemented at the host system, and
      implementing a pointer from the snapshot of the storage snapshot to a container implemented at the host system;
   wherein performing the one or more operations are performed on the image layer data, utilizing the structural representation created at the block storage system, includes:
      duplicating the storage volume within the block storage system, and mapping the duplicate storage volume to another different base device implemented at another different host system, and
      duplicating the storage snapshot within the block storage system, and mapping the duplicate storage snapshot to another different image implemented at the other different host system.

10. The computer-implemented method of claim 1, wherein creating the structural representation of the image layer data further includes creating, at the block storage system, metadata associated with the image layer data that describes the image layer data stored within the host system and is used to perform one or more actions associated with the image layer data.

11. The computer-implemented method of claim 1, wherein mapping the structural representation stored at the block storage system to the image layer data utilized at the host system includes mapping the storage volume to an associated base device implemented at the host system.

12. The computer-implemented method of claim 1, wherein mapping the structural representation stored at the block storage system to the image layer data utilized at the host system includes mapping the storage snapshot to an associated image implemented at the host system.

13. The computer-implemented method of claim 1, wherein mapping the structural representation stored at the block storage system to the image layer data utilized at the host system includes mapping a snapshot of the storage snapshot within the block storage system to a container implemented at the host system.

14. The computer-implemented method of claim 1, wherein mapping the structural representation stored at the block storage system to the image layer data utilized at the host system is performed by a storage agent located on the host system.

15. The computer-implemented method of claim 1, wherein the one or more operations include an optimization operation.

16. The computer-implemented method of claim 1, wherein the one or more operations include a migration operation.

17. The computer-implemented method of claim 1, wherein the one or more operations include mapping the structural representation stored at the block storage system to other different image layer data utilized at another different host system.

18. A computer program product for creating a structurally aware block storage system, the computer program product comprising a computer readable storage medium having program instructions embodied therewith, wherein the computer readable storage medium is not a transitory signal per se, the program instructions executable by a processor to cause the processor to perform a method comprising:

creating, at a block storage system separate from a host system, a structural representation of image layer data utilized at the host system, utilizing the processor, including:

creating, at the block storage system, a container pool that includes storage space within the block storage system that is specifically reserved for storing the structural representation of the image layer data, creating, at the block storage system, a storage volume within the container pool at the block storage system that indicates a block of data within the block storage system, and creating, at the block storage system, a storage snapshot within the storage volume, where the storage snapshot is associated with an image implemented at the host system;

mapping the structural representation created at the block storage system to the image layer data utilized at the host system, utilizing the processor; and performing, utilizing the processor, one or more operations on the image layer data, utilizing the structural representation created at the block storage system.

19. The computer program product of claim 18, wherein the image layer data utilized at the host system includes an image, the image including an executable software package that includes a description of runtime environment details.

20. A system, comprising:

a processor; and logic integrated with the processor, executable by the processor, or integrated with and executable by the processor, the logic being configured to:

create, at a block storage system separate from a host system, a structural representation of image layer data utilized at the host system, including:

creating, at the block storage system, a container pool that includes storage space within the block storage system that is specifically reserved for storing the structural representation of the image layer data, creating, at the block storage system, a storage volume within the container pool at the block storage system that indicates a block of data within the block storage system, and creating, at the block storage system, a storage snapshot within the storage volume, where the storage snapshot is associated with an image implemented at the host system;

map the structural representation created at the block storage system to the image layer data utilized at the host system; and perform one or more operations on the image layer data, utilizing the structural representation created at the block storage system.

* * * * *